United States Patent
Hofstedt (10) Patent No.: US 10,486,169 B2
(45) Date of Patent: Nov. 26, 2019

(54) METHOD AND DEVICE FOR SEPARATING TWO PHASES

(71) Applicant: Anders Göran Hofstedt, Linköping (SE)

(72) Inventor: Anders Göran Hofstedt, Linköping (SE)

(*) Notice: Subject to any disclaimer, the term of this patent is extended or adjusted under 35 U.S.C. 154(b) by 208 days.

(21) Appl. No.: 15/505,588

(22) PCT Filed: Aug. 20, 2015

(86) PCT No.: PCT/SE2015/050886
§ 371 (c)(1),
(2) Date: Feb. 21, 2017

(87) PCT Pub. No.: WO2016/028214
PCT Pub. Date: Feb. 25, 2016

(65) Prior Publication Data
US 2017/0246646 A1  Aug. 31, 2017

(30) Foreign Application Priority Data
Aug. 21, 2014 (SE) ...................... 1450971

(51) Int. Cl.
| | |
|---|---|
| *B04B 1/08* | (2006.01) |
| *B04B 5/10* | (2006.01) |
| *H05B 6/10* | (2006.01) |
| *D21C 11/00* | (2006.01) |
| *C11B 13/00* | (2006.01) |

(52) U.S. Cl.
CPC .............. *B04B 1/08* (2013.01); *B04B 5/10* (2013.01); *C11B 13/005* (2013.01); *D21C 11/0007* (2013.01); *D21C 11/0042* (2013.01); *H05B 6/101* (2013.01); *Y02W 30/74* (2015.05)

(58) Field of Classification Search
CPC ............ B04B 1/08; B04B 5/10; C11B 13/005
See application file for complete search history.

(56) References Cited

U.S. PATENT DOCUMENTS

| | | | | |
|---|---|---|---|---|
| 2,200,468 | A | | 5/1940 | Cirves |
| 2,963,219 | A | * | 12/1960 | Palmqvist ............... B04B 5/10 137/115.13 |
| 2014/0110359 | A1 | | 4/2014 | Haywood et al. |

FOREIGN PATENT DOCUMENTS

| | | |
|---|---|---|
| CL | 201302982 | 10/2013 |
| EP | 2181744 A1 † | 5/2010 |
| EP | 2664385 A1 | 11/2013 |
| WO | 2011053224 A1 | 5/2011 |
| WO | 2011056131 A1 | 5/2011 |
| WO | 2011081587 A1 † | 7/2011 |
| WO | 2012174259 A2 † | 12/2012 |

OTHER PUBLICATIONS

Axelsson, Hans, Recent Trends in Disc Bowl Centrifuge Development, Article in Filtration and Separation, May 2000, p. 20-23.
International Preliminary Report on Patentability, PCT/SE2015/050866, date of completion Nov. 22, 2016.
International Search Report and Written Opinion, PCT/SE2015/050886, dated Dec. 1, 2015.
European Search Report from corresponding European Application No. 15834612, dated Aug. 18, 2017.

* cited by examiner
† cited by third party

Primary Examiner — Pancham Bakshi
(74) Attorney, Agent, or Firm — Tucker Ellis LLP (57) ABSTRACT

The invention is characterised in the steps of a) performing a first separation of the mixture in a first centrifugal separator, resulting in a first heavy fraction comprised of the heavy phase with only small amounts of impurities in the form of the light phase and a first light fraction comprising of the light phase with impurities in form of the heavy phase; and b) performing a second separation of the first light fraction in a second hermetic centrifugal separator of purificator type, resulting in a second heavy fraction comprised of the heavy phase with impurities in the form of the light phase and a second light fraction comprised of the light phase with only small amounts of impurities in the form of the heavy phase. The invention also relates to a device.

16 Claims, 4 Drawing Sheets

METHOD AND DEVICE FOR SEPARATING TWO PHASES

The present invention relates to a method and a device for separating two phases. More particularly, the invention relates to the separation of a heavy phase with a higher density from a light phase with a lower density, which density difference between the phases is relatively small and wherein the viscosity of the isolated light phase is high.

Separation of such phases is performed within various technical areas.

A first example, as is current within the field of pulp fabrication, is cleaning of crude tall oil soap from black liquor. Black liquor is produced in large amounts in pulp fabrication by the kraft process. Among other things, the black liquor comprises so-called crude tall oil soap or tall oil soap, which it is desirable to separate out from the black liquor before the latter is supplied to, for example, an evaporation step and a subsequent recovery boiler for combustion. The crude tall oil soap can then be used for the preparation of tall oil. The black liquor has a typical density of between 1.080 and 1.115 kg/l (20-25% dry matter), while the crude tall oil soap, which in pure form has a very high viscosity, has a typical density of between 1.015 and 1.030 kg/l, depending on how much black liquor the concentrated soap contains. In this concentrated solid but soft soap, there is a certain proportion of black liquor, typically equivalent to approximately 35-40% of the amount of soap.

A second example, which is current within the food industry, consists of separating beta-glucans (light phase with high viscosity in isolated form) from dextrins (heavy phase with a density close to that of beta-glucans). The density of both phases is just over 1 kg/l, but the density of the beta-glucan phase is slightly lower than that for the slightly heavier dextrin phase. Similarly to the case for crude tall oil soap, the light phase beta glucan comprises a certain proportion of a heavy phase, that is, a dextrin solution. The contents of dextrin solution, after separation, in the light phase generally ranges between 60% and 70%. Even in this case, therefore, the density difference between the phases is relatively small.

Conventionally, so-called high speed centrifugal separators are used for separation, in which a separation bowl rotates, with typically at least 1000 revolutions per minute, such as at least 3000 rpm, more preferably at least 4500 rpm, preferably about 6000 rpm, and thereby creates a radially directed centrifugal force acting on the material contained within the bowl. As a result, a relatively lighter phase is hence pressed towards the bowl's centre of rotation, while a relatively heavier phase is pressed outwards, towards the periphery of the bowl. In order to increase the separation efficiency, stacks, also called disc sets, of stacked conical separating discs are used in the bowl. The discs in the disc set have a certain distance between them, which is defined by the caulks that are typically affixed on the upper face of the disc. The smaller caulks the better separation, since smaller caulks allow more discs to fit in the stack. Such a separator is described, for instance, in EP2664385 A1.

It is known, for example from SE534404 C2, to use a centrifugal separator to separate out the black liquor from separated parts of crude tall oil soap.

There are various types of centrifugal separators.

In so-called open separators, the phase mixture is fed in through an inlet, is separated and then delivered at different outlets. One type of such open separator delivers respective phases at the respective outlets at atmospheric pressure, which generally requires external pumps for further removal of the phase in question.

Using so-called paring discs, acting as centripetal pumps, the separated phases are instead delivered at the respective outlets at a certain overpressure. In a separator of this type, such as disclosed for instance in SE534386 C2, the boundary level in the bowl, that is, the horizontal distance from the centre of rotation where the boundary between the separated phases is located, can be adjusted by changing the width of the gravity discs or level discs, hereinafter referred to as level rings. Hence, using such level rings, the radial level of the heavier phase, which exerts a pressure on the lighter phase towards the centre of rotation, can be adjusted.

In such a separator, the heavier phase is pumped out through a paring disc disposed with its edge radially outside the corresponding paring disc which pumps out the lighter phase. Since the paring discs are fixedly disposed, and thus do not rotate with the bowl, there is a risk of leakage from the heavier phase to the lighter phase, especially if the pressure in the heavier phase is high.

A so-called hermetic separator, or a hermetically closed separator, on the other hand, is designed so that there is no free passage between the two separated phases in the separator. Instead, the output pressure is achieved by the mixture being pumped into the separator at an overpressure, which overpressure is also used to create a counter-pressure by means of so called counter-pressure valves provided on the output phases, which valves regulate the position of the boundary level in the bowl. Such a hermetic separator is described in, for example, SE0950840 A1. Additional remarkable features of a hermetic separator is that the separator during operation is completely filled with the fed mixture and the separated phases, and that no air is then present in the separator; and that a pressure which is applied at the outlet propagates to a corresponding pressure at the inlet, plus the pressure drop accruing because of the flow through the separation bowl.

Furthermore, there are different kinds of separators according to the phase which primarily is to be purified from the other. For this purpose, through-holes are used in the said stack of separating discs at a distance from the centre of rotation. This results in the two phases having to go a different radial distance before being collected. For maximum purification of the light phase, a so-called purificator is used, in which the holes are arranged relatively far from the centre of rotation. For maximum purification of the heavy phase, a so-called concentrator is used, wherein the holes are arranged relatively close to the centre of rotation.

It has proved difficult to separate two phases with relatively similar density in an efficient manner and with a high degree of purification, in particular when the light phase displays a high viscosity. Namely, in this case a very high pressure is required in the bowl, in order to cause the light phase to be pushed towards the centre of rotation, via the channels of the disc stack and out from of the separator. When using an open separator, there is then a risk of leakage of the heavy phase into the light phase, resulting in a low degree of purification. In order to reduce the need for a driving pressure, and thus the risk of leakage, relatively large spaces are required between the separating discs, resulting in deteriorated separation efficiency.

By applying a counter pressure onto the heavy phase outlet, the level of the heavy phase becomes located closer to the centre of rotation than what the level rings can achieve. This means that the working pressure in the separation bowl, which presses the light phase through the disc stack, can be increased somewhat. The amount of counter-pressure that can be applied is limited by the open construction. When the level is too far towards the centre of rotation, there is a risk that the heavy phase is pressed out of the machine through the space between the inlet and the rotating body. If the separator is equipped with a gravity disc, the counter-pressure must work against the generated pressure from the heavy phase gravity disc, resulting in greater energy consumption.

An alternative would be to use a hermetic separator to solve these problems. However, in this case it has been found that the losses become great in the separation of two phases with the characteristics described above, as it is difficult to provide an optimum location of the interface between the two phases in the separation bowl for the separator in question.

The present invention solves these problems.

Thus, the invention relates to a method for separating at least a light phase from a heavy phase, which phases are present in a mixture, wherein the heavy phase is a liquid phase and the light phase is either a liquid phase or a solid phase, characterized in that the method comprises the steps of a) in a first separating step, performing a first separation of the mixture in a first centrifugal separator, resulting into a first heavy fraction comprised of the heavy phase with only small amounts of impurities in the form of the light phase and a first light fraction comprised of the light phase with impurities in the form of the heavy phase; and b) in a second separating step, performing a second separation of the first light fraction in a second centrifugal separator of purificator type, resulting in a second heavy fraction comprised of the heavy phase with impurities in the form of the light phase and a second light fraction comprised of the light phase with only small amounts of impurities in the form of the heavy phase; wherein at least the second centrifugal separator is of hermetically closed type.

Moreover, the invention relates to a device.

The invention will now be described in detail, with reference to exemplifying embodiments of the invention and to the accompanying drawings, wherein.

Figure 1:
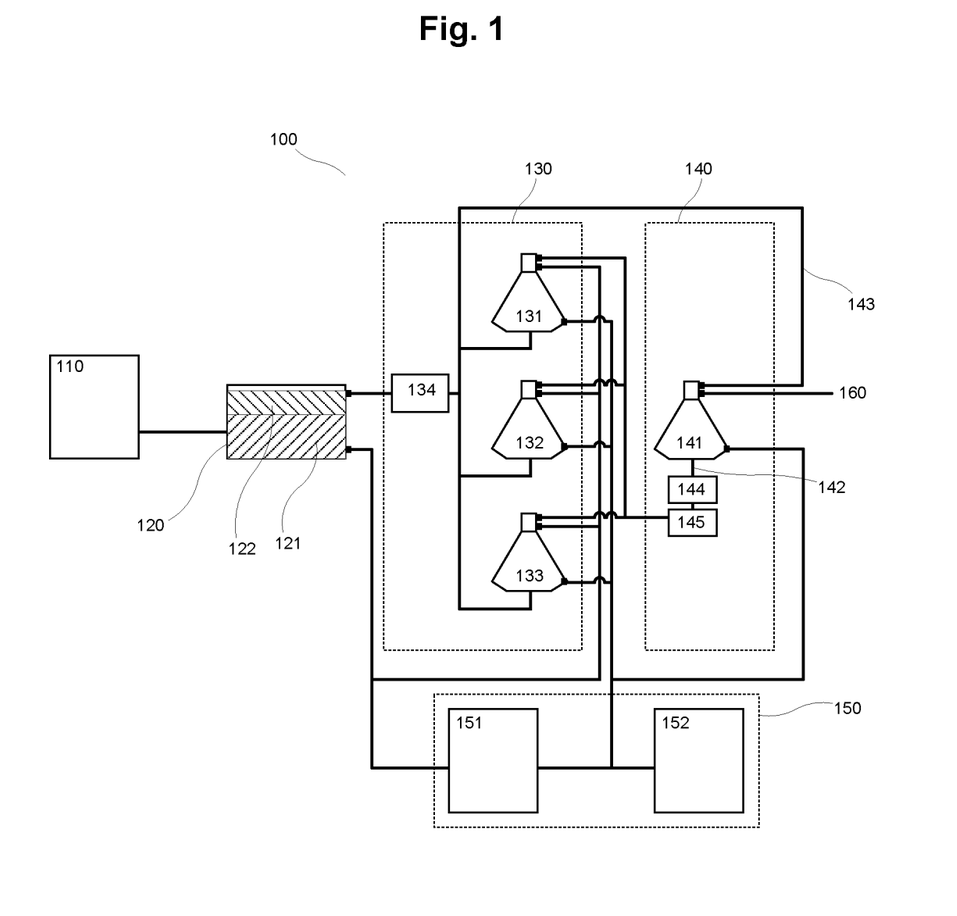
FIG. 1 is a schematic overview of a system according to the present invention, especially adapted for separating crude tall oil soap from black liquor.

FIG. 1 shows a system 100 according to the present invention for use in a method according to the invention. Specifically, the system 100 is useful in a method according to the invention for separating at least a heavy phase comprised of black liquor from a light phase comprised of crude tall oil soap. It is appreciated that the parts 130 and 140 (see below) similarly can be employed in the invention's method for separating other heavy phases, such as dextrin, from other light phases, such as beta-glucan.

That the invention relates to the "separation of at least a heavy phase from a light phase" should be interpreted so that it is also useful for the separation of more phases than said two phases. For example, the separation of black liquor from crude tall oil soap also typically comprises the separation of fibrous solids, and the separation of dextrin from beta-glucan also comprises the separation of proteins. Such solids, which are many times of fibrous constitution, and which are often heavier than said heavy and light phase, and which, in addition, may be referred to as a sludge phase, are preferably removed by ejection from the centrifugal separators used in the facility during operation in a known manner, and are not described in closer detail herein.

In FIG. 1, 110 denotes a per se conventional cooking step in a pulp manufacturing process according to the kraft process, which step 110, as a residual product, produces relatively large volumes of black liquor. This black liquor is supplied to a separating step 120, which may preferably, but not necessarily, be used for the present purposes, and the aim of which is to carry out a first separation of black liquor from crude tall oil soap. As shown in FIG. 1, it is preferred that the separating step comprises a gravimetric separation tank in which the crude tall oil soap, because of the density difference relative to the black liquor, rises to the surface, so that a relatively concentrated crude tall oil soap fraction 122 is formed floating on top of a fraction of the concentrated black liquor 121, which is relatively purified from crude tall oil soap. The black liquor fraction 121 is passed on to the subsequent process steps 150, which process steps 150 may for instance comprise a conventional evaporation step 151 and a per se conventional recovery boiler 152.

The system 100 can thus, but does not have to, comprise the separating step 120.

The black liquor from step 110, alternatively the fraction of crude tall oil soap separated in step 120, which then still comprises certain amounts of black liquor, is passed to a separating step according to the invention, which in turn comprises a first upstream arranged separating step 130 and a second, downstream arranged separating step 140 which is connected to the first separating step 130.

Thus, the crude tall oil soap which comprises black liquor impurities and which is taken to step 130 is present in the form of a mixture of a light phase, comprised of the crude tall oil soap, and a heavy phase, comprised of black liquor. If no initial step 120 is used, the light phase still is comprised of the crude tall oil soap, and the heavy phase is comprised of black liquor, but in different proportions.

Hence, according to the present invention, in step 130, a separation is performed of the said mixture by means of at least one centrifugal separator 131, 132, 133. It is preferred that the at least one centrifugal separator 131, 132, 133 is of concentrator type, which results in the highest efficiency. If larger amounts of fibrous material are present in the form of a sludge phase in the mixture to be separated, in some cases there will occur problems with clogging of a first centrifugal separator 131, 132, 133 of concentrator type, which clogging requires manual and repeated cleaning of the concentrator disc stack, with associated downtime. To solve this problem, in such case, it is preferred to provide a further separating device (not shown in the drawings), such as one or more self-cleaning sieves of conventional design, along the feed flow to the first centrifugal separator(s) 131, 132, 133 of concentrator type, arranged to remove a portion of such a sludge phase. As a further option, or possible supplement to such an additional separation device, for solving the problem in question the at least once centrifugal separator 131, 132, 133 may be of purificator type instead of concentrator type.

The centrifugal separators 131, 132, 133, in the event that they are more than one in number, are preferably connected in parallel, so that each of them treats a certain portion of the mixture to be separated fed to step 130.

Figure 2:
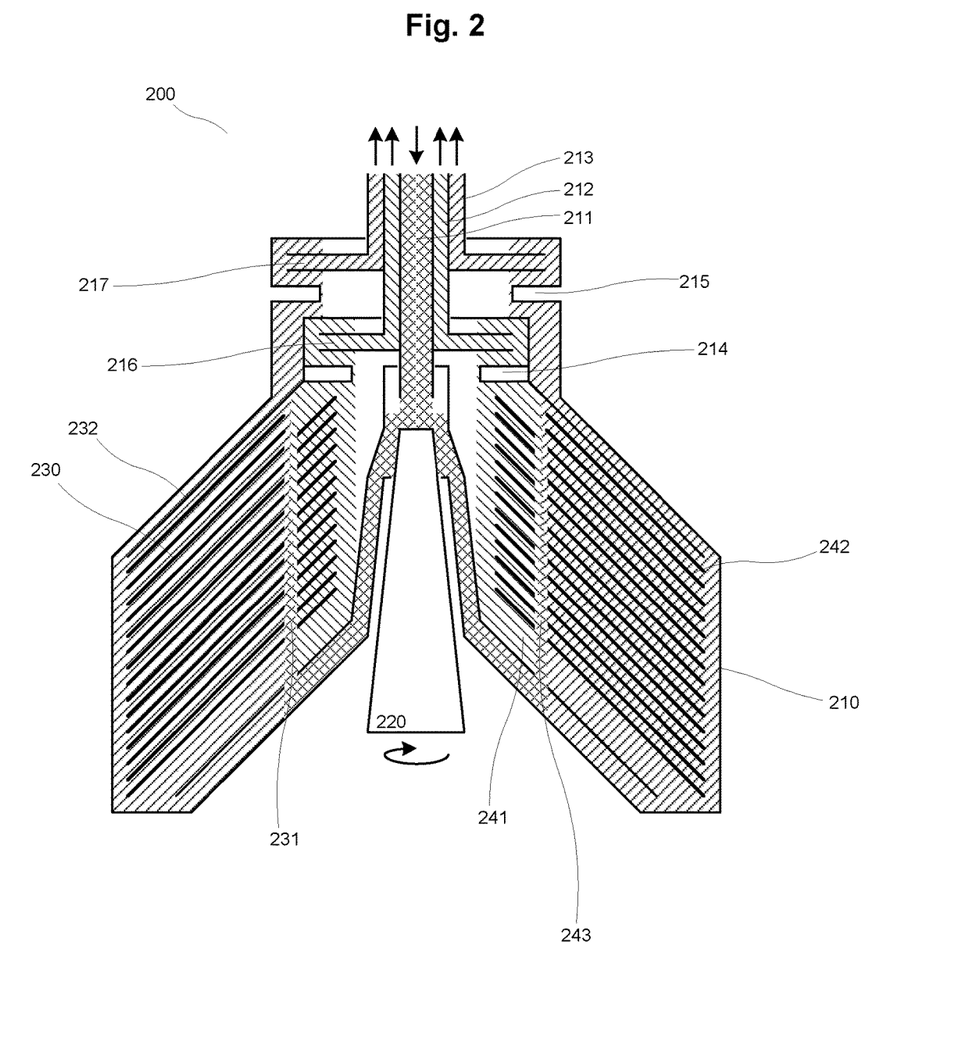
FIG. 2 is a schematic diagram of an open centrifugal separator of concentrator type.

Such a centrifugal separator of concentrator type is illustrated in FIG. 2, in the form of an as such conventional, open centrifugal separator 200, comprising a central inlet 211 for the mixture through which the mixture is introduced into the bowl 210 for separation therein, and an exit via respective outlets 212 for a light phase 241 and 213 for a heavy phase 242. The two phases 214, 242 and the mixture of them are marked using different types of broken lines in FIGS. 2-4.

The bowl 210 is rotated, preferably at a rotation speed of at least 1000, preferably at least 3000, preferably at least about 4500, preferably about 6000 rpm, by means of a drive mechanism acting on a shaft 220. A stack of a plurality of separating discs 230 are used to increase the efficiency of the separation, in a per se conventional manner. The light phase 241 is pressed radially inwards, and is pumped through a stationary arranged centripetal pump 216 (hidden in FIG. 1). Similarly, the heavy phase 242 is pressed radially outwards, is passed over a so called top plate 232 located above the disc stack, and is pumped out through a stationary arranged centripetal pump 217 (also hidden in FIG. 1). To control the radial, horizontal distance between the centre of rotation of the bowl 210 and the interface 243 between the light 241 and the heavy 242 fraction, respective adjustable level rings 214, 215 are used in a per se conventional manner.

The centripetal pumps 216, 217, in particular the centripetal pump 216 which is used for the light phase, provide a certain overpressure of the light phase 241 discharged from the outlet 211.

The separation plates 230 comprise through holes 231, preferably arranged opposite one another so that a substantially vertical through channel is formed through the stack. The through holes 231 are arranged at a radial distance from the bowl's centre of rotation which causes the heavy phase 242 which is fed out through the outlet 213 to be relatively pure, preferably purer than the light phase 241 which is discharged through the outlet 212.

The light phase will then, because of the use of the pump 216, be supplied at a certain overpressure at the outlet 212.

Figure 3:
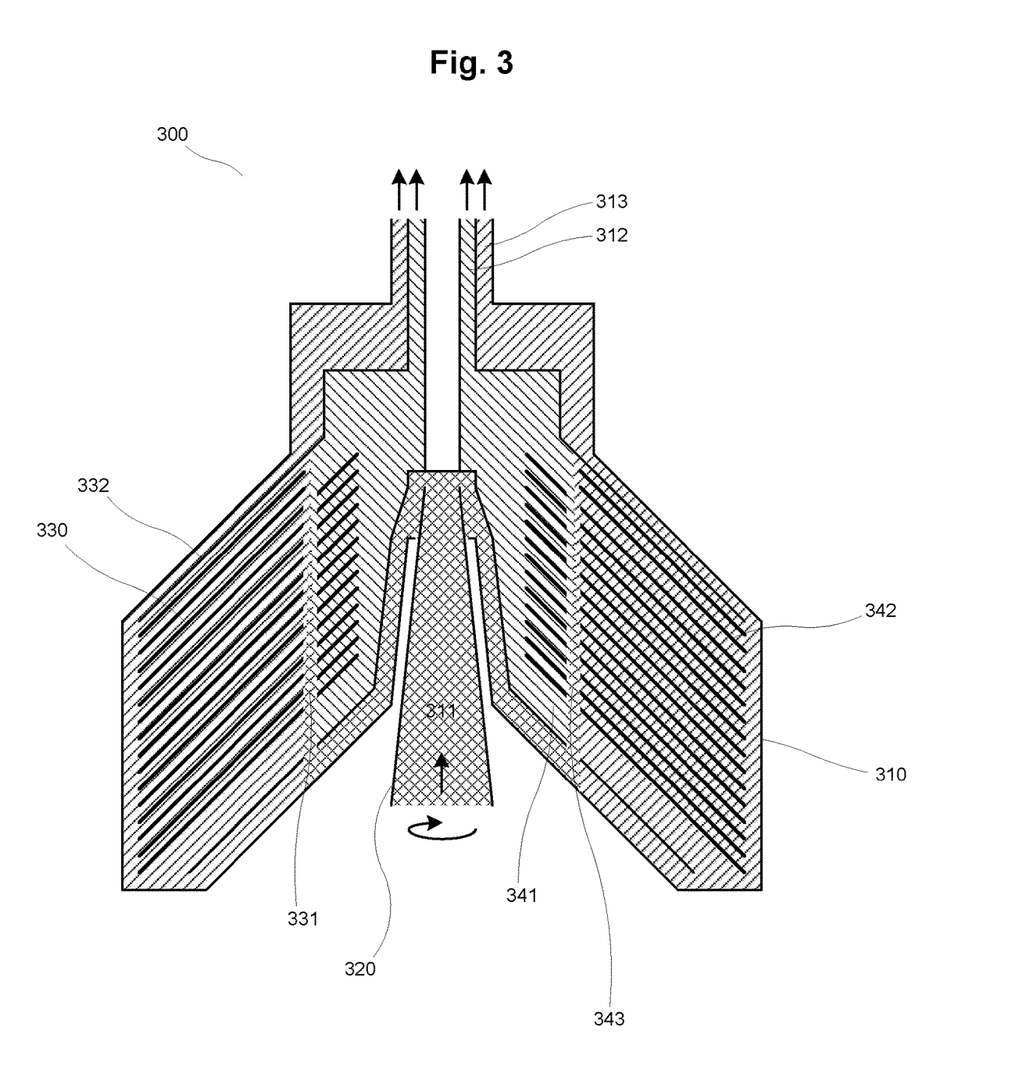
FIG. 3 is a schematic diagram of a hermetic centrifugal separator of concentrator type.

FIG. 3 corresponds to FIG. 2, but shows a hermetic centrifugal separator 300 of concentrator type. The separator 300 comprises, as is the case with separator 200, a stack of separating discs 330 with holes 331 forming a substantially vertical through channel through the stack 330. The mixture is supplied via an inlet 311 provided through a rotating shaft 320, which, in a way similar to the separator 200, is driven with at least 1000, preferably at least 3000, preferably at least 4500, preferably about 6000 rpm, and hence also rotation drives the bowl 310 with this rpm.

The radial, horizontal distance from the centre of rotation of the bowl 310 for an interface 343 between the separated light phase 341 and the separated heavy phase 342 is regulated by controlling the various counter-pressures on the output phases, which is achieved using an overpressure by means of which the mixture is supplied to the inlet 311. Via an outlet 312, the light phase, with some impurities in the form of the heavy phase, is supplied; via lead over of a top plate 332, positioned above the disc stack, and through an outlet 313, the heavy phase, with some impurities in the form of the light phase, is delivered. Since the holes 331 are disposed relatively close to the rotational centre, the heavy phase delivered via the outlet 313 will, in a manner corresponding to that described above for the separator 200, be relatively pure, preferably purer than the light phase which is delivered via outlet 313.

One difference between the separators 200 and 300 is that the phases 341, 342 which are supplied from the outlets 312, 313 can have a greater overpressure at the outlets 312, 313 than what is the case for the phases 241, 242 being delivered from the outlets 212, 213, since the mixture is already present at an overpressure via the inlet 311. In order to accomplish this overpressure, an as such conventional pump can be used. Additionally, a greater counter-pressure can be applied to the heavy phase 342 than what is possible for the heavy phase 242, since a too great counter-pressure on the phase 242 risks resulting in leakage from phase 242 to the light phase 241 in the separator 200, or crowding out of the separator through the gap between the rotating body and inlet manifold.

Figure 4:
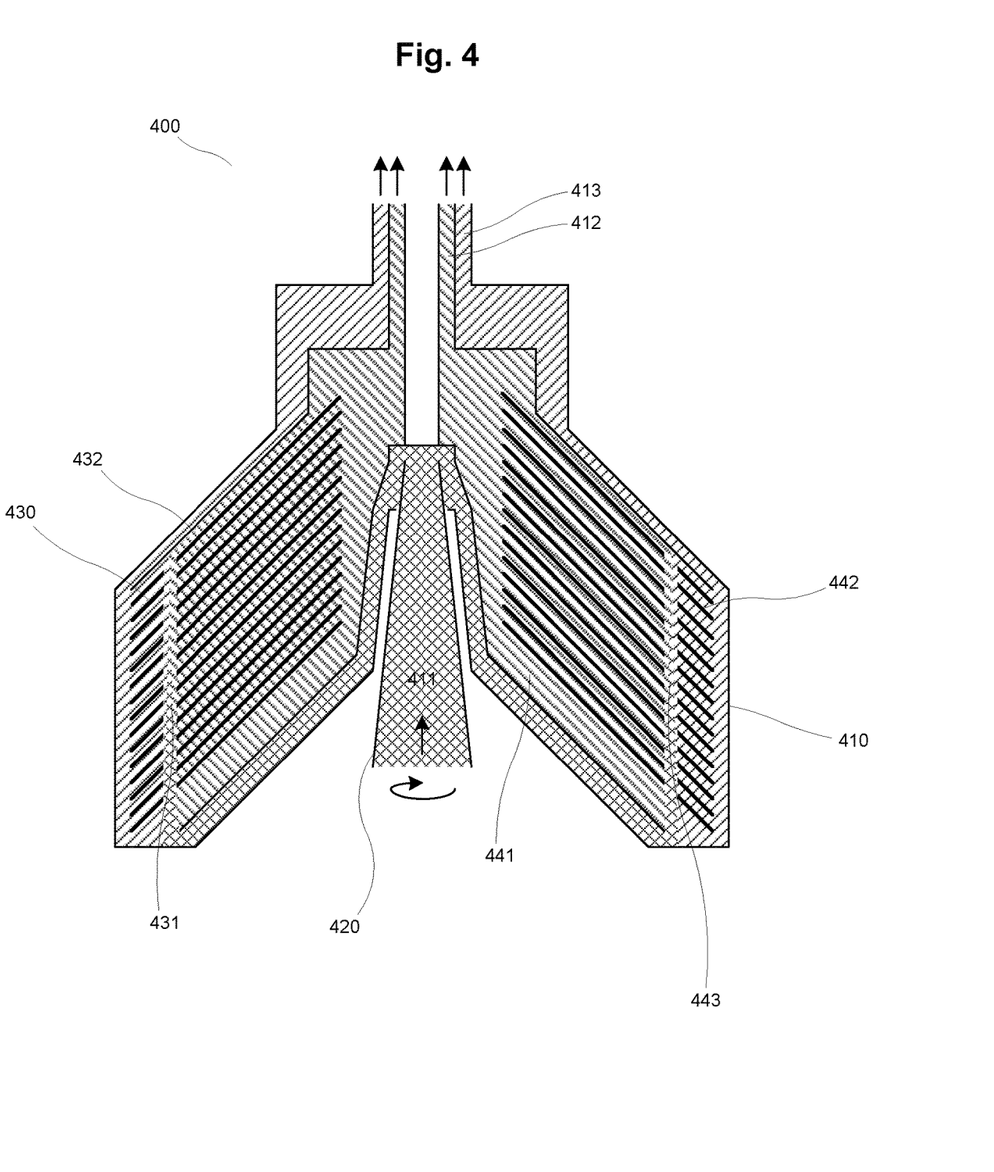
FIG. 4 is a schematic diagram of a hermetic centrifugal separator of purificator type.

FIG. 4 illustrates a hermetic centrifugal separator 400 which in all ways corresponds to the separator 300, but where the separator 400 is rather of purificator type than of concentrator type. The separator 400 thus comprises a stack of separating discs 430 with through holes 431 forming a substantially vertical channel through the stack; a top plate 432 forming a channel for the heavy phase above the disc stack; a rotary driven shaft 420 with a likewise rotationally driven bowl 410 where the shaft 420 has a through inlet 411 for the mixture; an interface 443 between a separated heavy 442 and a separated light phase 441, respectively, and outlets 412, 413 for the light 441 and the heavy 442 phases, respectively.

Unlike in the separator 300, the holes 431 are arranged relatively far out from the centre of rotation, so that the light phase 441 supplied via the outlet 412 will be relatively pure, preferably purer than the heavy phase 442 supplied via the outlet 413.

For all separators 200, 300, 400 described herein, it is preferred that the radial distance from the centre of rotation of the boundary 243, 343, 443 is regulated to be approximately within the holes 231, 331, 431. This is in itself conventional.

The distances between the separating discs 230, 330, 430 is preferably maximum 3 mm, preferably between about 0.5 and 2 mm.

The first separation of the mixture being performed in step 130 is thus conducted in at least one centrifugal separator which is preferably of concentrator type. It will be appreciated that there may be one or more open centrifugal separators 200, of the type illustrated in FIG. 2, or one or more hermetic centrifugal separators 300, of the type illustrated in FIG. 3. It is also possible, when several centrifugal separators are used, preferably in parallel, in step 130, that both types of separators 200, 300 are used in combination.

This first separating step 130 will thus result in a first heavy fraction comprised of the heavy phase 242, 342 with only small amounts of impurities in the form of the light phase 241, 341, and a first light fraction comprised of the light phase 241, 341 with impurities in the form of the heavy phase 242, 342. In other words, the first heavy fraction, which in the present example mainly consists of black liquor, generally is relatively pure, preferably more pure than the first light fraction, which in the present example mainly consists of crude tall oil soap. It is preferred that the first light fraction comprises between 15 and 50 volume percent of the heavy phase. Moreover, it is preferred that the first heavy fraction comprises less than 1 percent by volume, preferably less than 0.5 percent by volume, preferably less than 0.1 percent by volume, of the light phase.

The separated first heavy fraction is passed to the subsequent processing step 151. Shot-out, fibre-containing sludge is brought to the subsequent processing step 152.

According to the invention, a second separation is then performed, in a step 140, of the first light fraction discharged from the step 130. This second separation is carried out in, and using, a second centrifugal separator 141 of purificator type which is of hermetically closed type. For example, the second separator 141 may be of the type 400 as illustrated in FIG. 4.

This second separating step 140, which is thus connected in series downstream of the first separating step 130, results, according to the invention, in a second heavy fraction, comprised of the heavy phase 442 with impurities in the form of the light phase 441 and a second light fraction, comprised of the light phase 441 with only small amounts of the impurities in the form of the heavy phase 442. In other words, the second heavy fraction, which in the present example mainly consists of black liquor, is relatively pure, preferably more pure than the first light fraction, which in the present example mainly consists of crude tall oil soap. It is preferred that the second light fraction comprises less than 10 percent by volume, more preferably less than 5 percent by volume, of the heavy phase. In this context, the "heavy phase" signifies the free proportion of black liquor, which thus does not exist in a form contained in the tall oil soap. In order to determine the proportion of the heavy phase, an assay may be performed according to the following. A light phase sample is centrifuged in a laboratory centrifuge of the type Pinola Hotspin at 3000 revolutions per minute during 5 minutes, after which the separated amount of black liquor is measured.

The second light fraction is passed on to an outlet 160 for further treatment. In the case of crude tall oil soap, such treatment can for example be a step in which crude tall oil soap is treated with suitable acids to provide tall oil.

Such a method, wherein in a first step 130 a mix is purified from a relatively large proportion of the heavy phase, and in which the separated heavy phase only comprises small impurities of the light phase, and wherein, in a second step 140, the separated light fraction is further purified in a hermetically closed centrifugal separator 141, in order to achieve a very clean light phase, makes it possible for a light phase to be separated from a heavy phase with high effectiveness and efficiency, even when the two phases are close in density, and although the light phase has a very high viscosity in its pure state. Namely, using the hermetic separator 141, it is possible to apply a pressure at the inlet 411 to the separator 141 in step 140, and at the same time applying a pressure at the outlet 413 which is sufficient to provide an internal working pressure in the separation bowl which in turn is great enough to be able to press out the light phase, although its density is not significantly different from the density of the heavy phase and despite the light phase in the pure state being highly viscous, and possibly even solid.

In a preferred embodiment, the second centrifugal separator 141 is connected downstream of the at least two first centrifugal separators 131, 132, 133, so that the first light fraction from the at least two first centrifugal separators 131, 132, 133 are caused to be fed to the inlet of the second centrifugal separator 141. In general, it is preferred that one or more centrifugal separators are used in the step 130, and that one or more centrifugal separators are used in the step 140, but that a lesser number of centrifugal separators are used in step 140 than in step 130, and that at least one of the separators in step 140 through its inlet receives the first light fraction from at least two different separators in step 130. It is particularly preferred that the number of separators in step 130 is at least twice as many, more preferably at least three times as many, as in step 140; that the total capacity of the separators in step 130 is at least twice, preferably at least 5 times larger, more preferably at least 10 times larger, than the total capacity of the separator or separators in step 140; and/or that all separators in step 130 feed their respective first light fraction on to the separators in step 140. Regardless of the number of separators in steps 130 and 140, it is preferred that the total capacity of the separator or separators in step 130 is larger, preferably at least twice as large as the total capacity of the separator or separators in step 140. All these capacities are calculated as capacity with respect to the maximum total inflow to the respective separator or separators in each respective step 130, 140.

It is preferred that the total capacity of each centrifugal separator in step 140, more preferably the total capacity in step 140, is maximally 20 $m^3/h$ concerning crude tall oil soap.

Since a large portion of the heavy phase is purified away in step 130, as a consequence fewer and possibly smaller separators will be required in step 140 to further clean the light phase. This is particularly true if the original mixture brought to step 130 from step 110 or 120 is only comprised of minor proportions, such as a maximum of 50 percent by volume, preferably a maximum of 5 percent by volume, of light phase, which is typically the case with, for example, black liquor from step 110 and possibly also from step 120.

Since the separator or separators in step 140 generally require a greater operating pressure than the separators in step 130, and since such great pressures cannot easily be achieved using a separator of the open type, this results in a more cost-efficient system than heretofore possible.

In a preferred embodiment, however, even at least one, preferably all, centrifugal separators 131, 132, 133 in step 130 are also of hermetically closed type. This results in that a higher degree of separation may be accomplished in step 130, allowing a larger inflow per separator to be processed for the same degree of purification of the black liquor. In order to achieve a suitably high input pressure to the separators 131, 132, 133, in this case a conventional pump 134 may be used upstream of the separators 131, 132, 133. It will be appreciated that the pump 134 is not necessary in all embodiments, as when open separators 131, 132, 133 are used or when an overpressure is provided in other ways to the mixture fed into the step 130.

In a preferred embodiment, which is illustrated in FIG. 1, the second heavy fraction is returned from step 140 to the first step 130, via a line 143, in a feedback loop. This allows the residual portions of the light phase comprised in the second heavy fraction to be recycled to the separating step 130, which results in higher overall purity and yield of purified crude tall oil soap.

In FIG. 1 there is further illustrated, along a line 142 which is arranged to bring the first light fraction to the separator 141 in step 140, a small equalization- or pump tank 145, the purpose of which is to counter fluctuations in the flow from separators 131, 132, 133, and to which tank 145 a pump 144 is connected and arranged to provide the first light fraction to the separator 141 inlet 411 at an overpressure, so as to achieve the above described operating pressure in the separator, in order to press out the light phase sufficiently.

It is preferred that the difference in density between the light and the heavy phase is about 5% or less. For example, typical densities of black liquor are 1.093 (about 22% dry matter in the black liquor at 93° C.), while typical densities for pure crude tall oil soap are 1.023 (about 22% dry matter in the black liquor at 93° C.)

As mentioned above, the present method and system are particularly advantageous when the light phase in its pure form is highly viscous, in particular in case the light phase has a significantly higher viscosity than the viscosity of the heavy phase, or is even a solid phase. This also means that the second light fraction, which is output at 160, is highly viscous. It will be appreciated that the second light fraction may have a lower viscosity than the pure light phase, since the second light fraction can still comprise impurities in the form of the heavy phase. Preferably, the second light fraction has a viscosity of at least 0.01, preferably at least 0.05, preferably at least 0.1, preferably at least 0.5 Pa·s, depending on which specific phases that are separated. In the case of tall oil soap, it is preferred that the second light fraction has a viscosity of about 2 Pa·s.

It is further preferred that the viscosity of the second light fraction is at least 10 times, more preferably at least 50 times, more preferably at least 100 times, higher than the viscosity of the first heavy fraction, which is brought to step 151 from step 130.

According to the invention, the heavy phase is generally a liquid phase, and the light phase is generally either a liquid phase or a solid phase.

As mentioned above, a preferred embodiment is constituted by the separation of crude tall oil soap from a mixture of black liquor and crude tall oil soap. As discussed above, in this case the heavy phase is black liquor from the boiling step in a method for producing pulp according to the kraft process, while the light phase is comprised of black liquor comprised in the crude tall oil soap. As described above, it may also be that, in an initial step, crude tall oil soap products in the form of black liquor contaminated crude tall oil soap is separated from black liquor derived from the cooking step in a process for pulp fabrication according to the kraft process, and that the thus separated crude tall-oil soap products constitute said mixture.

However, a method according to the present invention is also applicable to, for example, a combination of a light phase comprised of beta-glucan and a heavy phase comprised of dextrin.

Above, preferred embodiments have been described. However, numerous modifications may be made to these embodiments without departing from the basic idea of the invention.

For example, also other mixtures consisting of a light phase and a heavy phase, where the density difference between them is small and where the light phase is preferably highly viscous, can advantageously be separated by means of a method and a system according to the present invention.

Furthermore, other combinations of the number of separators used in step 130, and the number of separators used in step 140, can be used than those described above and illustrated in FIG. 1.

Additionally, other types of separators than those illustrated in FIGS. 2-4 may be used. However it is preferred not to use separators of the so called basket centrifuge type.

Thus, the invention is not limited to the above described embodiments, but may be varied within the scope of the enclosed claims.

The invention claimed is:

1. A method for separating at least a light phase from a heavy phase, which phases are present in a mixture, wherein the heavy phase is a liquid phase and the light phase is either a liquid phase or a solid phase, wherein either the heavy phase is comprised of black liquor from a boiling step of a process for producing pulp according to the kraft process and the light phase is comprised of crude tall oil soap comprised in the black liquor, or the light phase is comprised of beta-glucan and the heavy phase is comprised of dextrin, wherein the method comprises the steps of:
    a) in a first separating step, performing a first separation of the mixture in a first centrifugal separator, resulting in a first heavy fraction comprised of the heavy phase with impurities in the form of the light phase and a first light fraction comprised of the light phase with impurities in the form of the heavy phase; and
    b) in a second separating step, performing a second separation of the first light fraction in a second centrifugal separator of purificator type, resulting in a second heavy fraction comprised of the heavy phase with impurities in the form of the light phase and a second light fraction comprised of the light phase with impurities in the form of the heavy phase;
    wherein at least the second centrifugal separator is of hermetically closed type; and wherein the viscosity of the second light fraction is at least 10 times higher than the viscosity of the first heavy fraction.

2. The method according to claim 1, wherein the first centrifugal separator is of concentrator type.

3. The method according to claim 1, wherein the first centrifugal separator is of hermetically closed type.

4. The method according to claim 1, wherein the second heavy fraction is returned to the first separating step.

5. The method according to claim 1, wherein the first centrifugal separator is caused to comprise a stack of separating discs comprising through holes arranged at a radial distance from a centre of rotation, resulting in the first heavy phase having less impurities than the first light phase.

6. The method according to claim 1, wherein the second centrifugal separator is caused to comprise a stack of separating discs comprising through holes arranged at a radial distance from a centre of rotation, resulting in the second light phase having less impurities than the second heavy phase.

7. The method according to claim 1, wherein the maximum total inflow of the separator or separators in the first separating step is larger than the maximum total inflow of the separator or separators in the second separating step.

8. The method according to claim 1, wherein the second centrifugal separator and the first centrifugal separators are driven at at least 1000 revolutions per minute.

9. The method according to claim 1, wherein the second centrifugal separator is caused to be connected downstream of both the first centrifugal separator and another centrifugal separator that together carry out the first separating step, so that the respective first light fraction from the centrifugal separators of the first separating step is caused to be fed to the inlet of the second centrifugal separator.

10. The method according to claim 1, wherein the density difference between the light and the heavy phase is about 5% or less.

11. The method according to claim 1, wherein the viscosity of the second light fraction is at least 0.01.

12. The method according to claim 1, further comprising an initial separating step comprising separating a crude tall oil soap product in the form of black liquor contaminated crude tall oil soap from the black liquor that originated from the boiling step of the process for producing pulp according to the kraft process, wherein the mixture is the crude tall oil soap product.

13. The method according to claim 1, wherein the second centrifugal separator and the first centrifugal separator are driven at at least 3000 revolutions per minute.

14. The method according to claim 1, wherein the second centrifugal separator and the first centrifugal separator are driven at at least 4500 revolutions per minute.

15. The method according to claim 1, wherein the viscosity of the second light fraction is at least 0.5 Pa·s.

16. The method according to claim 1, wherein the second centrifugal separator is driven at at least 1000 revolutions per minute.

* * * * *